(12) United States Patent
Flatness et al.

(10) Patent No.: US 12,352,468 B2
(45) Date of Patent: Jul. 8, 2025

(54) HEAT TRAP APPARATUS FOR WATER HEATER

(71) Applicant: Rheem Manufacturing Company, Atlanta, GA (US)

(72) Inventors: Gary Flatness, Montgomery, AL (US); William White, Montgomery, AL (US); Jason Hall, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 932 days.

(21) Appl. No.: 17/488,415

(22) Filed: Sep. 29, 2021

(65) Prior Publication Data

US 2023/0101175 A1 Mar. 30, 2023

(51) Int. Cl.
| | |
|---|---|
| *F24H 9/13* | (2022.01) |
| *F16K 15/14* | (2006.01) |
| *F24D 19/00* | (2006.01) |
| *F24H 1/18* | (2022.01) |

(52) U.S. Cl.
CPC ............ *F24H 9/136* (2022.01); *F16K 15/148* (2013.01); *F24D 19/0092* (2013.01); *F24H 1/185* (2013.01)

(58) Field of Classification Search
None
See application file for complete search history.

(56) References Cited

U.S. PATENT DOCUMENTS

| | | | |
|---|---|---|---|
| 5,277,171 A | 1/1994 | Lannes | |
| 2001/0004009 A1* | 6/2001 | MacKelvie | F24D 17/0005 |
| | | | 165/47 |
| 2005/0139171 A1* | 6/2005 | Robison | F24H 9/133 |
| | | | 122/14.31 |
| 2005/0263190 A1* | 12/2005 | Hammond | F16K 15/035 |
| | | | 137/512 |
| 2006/0054110 A1* | 3/2006 | Passerell | F16K 15/148 |
| | | | 122/14.31 |
| 2019/0003740 A1 | 1/2019 | Murphy | |

OTHER PUBLICATIONS

International Search Report of PCT Patent Application No. PCT/US2022/043293 dated Dec. 22, 2022.
Written Opinion of the International Search Authority of PCT Patent Application No. PCT/US2022/043293 dated Dec. 22, 2022.

* cited by examiner

*Primary Examiner* — Ibrahime A Abraham
*Assistant Examiner* — Joe E Mills, Jr.
(74) *Attorney, Agent, or Firm* — Eversheds Sutherland (US) LLP

(57) ABSTRACT

A heat trap apparatus for a water heater is provided. The heat trap apparatus includes a tubular body, a liner disposed within the tubular body, and a heat trap baffle assembly having a tubular housing coaxially disposed within the liner. The liner includes a projection to engage with an inner surface of the tubular body at a first end using an interference fit. The tubular housing includes a first diametric portion to engage with the inner surface of the tubular body at a second end using an interference fit, a second diametric portion extending from the first diametric portion and to engage with an inner surface of the liner using an interference fit, and a third diametric portion extending from the second diametric portion and to movably support one or more heat trap inserts to inhibit convective fluid flow therethrough.

17 Claims, 5 Drawing Sheets

HEAT TRAP APPARATUS FOR WATER HEATER

TECHNICAL FIELD

The present disclosure relates, in general, to a water heater and, more specifically relates, to a heat trap apparatus for the water heater.

BACKGROUND

Water heaters are used to heat and store a quantity of water in a tank thereof for subsequent, on-demand delivery of hot water for residential and commercial use. When the water heater is not in an operating mode, it is desirable to reduce or avoid heat loss from the stored hot water to cooler areas. To avoid or minimize such heat loss, the tank of the water heater is insulated. Thermal efficiency is also vital to the operation of the water heater to make the water heater more energy efficient. An effective insulating material is generally used in the body of the water heater. This insulating material traps heat inside the water heater to enhance the thermal efficiency and thereby to improve energy efficiency of the water heater.

However, the heat from the stored hot water may also be lost by the thermal convection flow of the hot water from the tank through the cold-water inlet conduit and hot water outlet conduit. To minimize convective heat loss, various convective heat trap apparatuses have been developed to connect the cold-water inlet conduit and the hot water outlet conduit to the tank. However, the galvanic circuit with the known heat trap apparatuses having dissimilar materials lead to premature failure of components. Further, the current arrangement of connecting conduits and the heat trap apparatuses lack seal between the liner and the ends of tube, which in turn causes degradation of steel components of the galvanic circuit. Thus, there is a need to develop a heat trap apparatus of longer component life and mitigate shortcomings of the existing heat trap apparatuses.

SUMMARY

According to one aspect of the present disclosure, a heat trap apparatus for a water heater is disclosed. The heat trap apparatus includes a tubular body, a liner disposed within the tubular body, and a heat trap baffle assembly having a tubular housing coaxially disposed within the liner. In an embodiment, the tubular body is made of a material comprising a metal. The liner includes a projection configured to engage with an inner surface of the tubular body at a first end thereof using an interference fit. A difference value between an outer diameter of the projection of the liner and an inner diameter of the tubular body is about 0.015 to 0.025 inches to achieve the interference fit therebetween. In one embodiment, the projection of the liner is located at a first end thereof. A length of the liner defined between the first end and a second end thereof is smaller than a length of the tubular body defined between the first end and the second end thereof. In another embodiment, the liner includes a flange at the first end thereof and is configured to engage with a peripheral edge of the first end of the tubular body. In another embodiment, the liner includes one or more ribs defined at an outer surface at the second end thereof and is configured to engage with the inner surface of the tubular body to achieve an interference fit therebetween. In another embodiment, the liner is made of a material comprising a plastic.

The tubular housing includes a first diametric portion configured to engage with the inner surface of the tubular body at a second end thereof using an interference fit. A difference value between an outer diameter of the first diametric portion of the tubular housing and an inner diameter of the tubular body is about 0.015 to 0.025 inches to achieve the interference fit therebetween. The tubular housing further includes a second diametric portion extending from the first diametric portion and configured to engage with an inner surface of the liner using an interference fit. A difference value between an outer diameter of the second diametric portion of the tubular housing and an inner diameter of the liner is about 0.015 to 0.025 inches to achieve the interference fit therebetween. The tubular housing further includes a third diametric portion extending from the second diametric portion and configured to movably support one or more heat trap inserts to inhibit convective fluid flow therethrough. In an embodiment, the third diametric portion of the tubular housing includes one or more slots to movably support the one or more heat trap inserts. In an embodiment, the tubular housing includes a flange at a first end thereof and is configured to engage with a peripheral edge of the second end of the tubular body. In an embodiment, the tubular housing is made of a material comprising a plastic.

In one embodiment, the tubular housing includes a first chamfer portion at a juncture of the first diametric portion and the second diametric portion. In another embodiment, the tubular housing includes a second chamfer portion at a juncture of the second diametric portion and the third diametric portion. In yet another embodiment, the tubular housing includes a third chamfer portion defined at a peripheral edge of a second end thereof.

According to another aspect of the present disclosure, a water heater is disclosed. The water heater includes a tank, one or more heat trap apparatuses mounted on the tank, and one or more conduits fluidly coupled to the one or more heat trap apparatuses. The heat trap apparatus includes a tubular body configured to fluidly couple with the conduit, a liner disposed within the tubular body, and a heat trap baffle assembly having a tubular housing coaxially disposed within the liner. In an embodiment, the first end and the second end of the tubular body includes threads configured to fluid tightly couple with the one or more conduits. The liner includes a projection configured to engage with an inner surface of the tubular body at a first end thereof using an interference fit. The tubular housing includes a first diametric portion configured to engage with the inner surface of the tubular body at a second end thereof using an interference fit. The tubular housing further includes a second diametric portion extending from the first diametric portion and configured to engage with an inner surface of the liner using an interference fit. The tubular housing further includes a third diametric portion extending from the second diametric portion and configured to movably support one or more heat trap inserts to inhibit convective fluid flow therethrough.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof)

may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
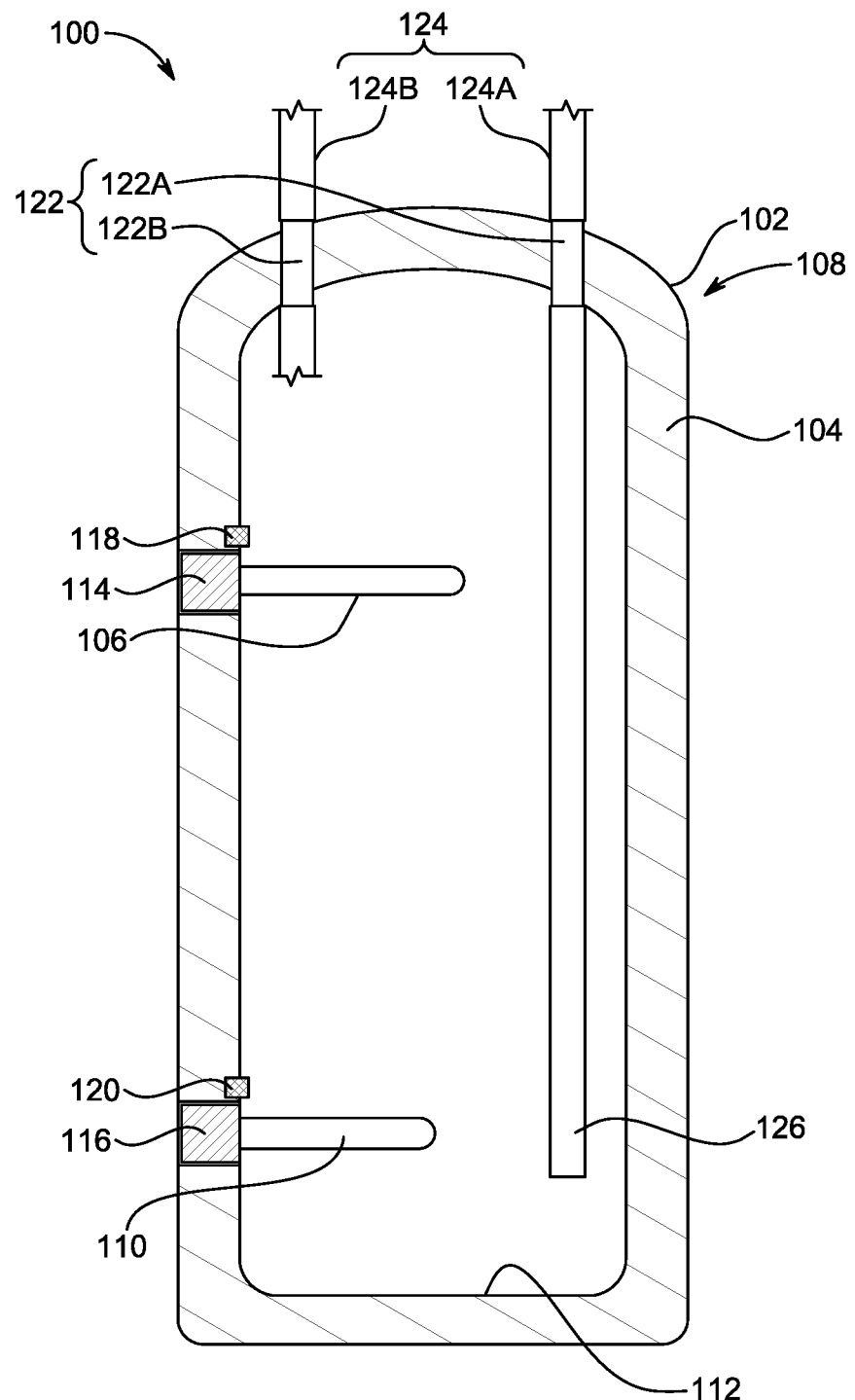
FIG. 1 is a schematic cross-sectional view of a water heater showing heat trap apparatuses, according to an embodiment of the present disclosure.

Referring to FIG. 1, a schematic cross-sectional view of a water heater 100 is illustrated, according to an embodiment of the present disclosure. The water heater 100 includes a tank 102 having a wall 104. The water heater 100 further includes one or more heating elements coupled to the wall 104 and configured to heat water. In an embodiment, a first heating element 106 is disposed proximate a top end 108 of the tank 102 and a second heating element 110 is disposed proximate a base 112 of the tank 102. The first heating element 106 and the second heating element 110 may be attached to the wall 104 using a first coupling 114 and a second coupling 116, respectively. Electric current supply to the first heating element 106 and the second heating element 110 may be routed through the first coupling 114 and the second coupling 116, respectively. The water heater 100 further includes a first thermostat 118 and a second thermostat 120 configured to sense temperature of water proximate the top end 108 and the base 112, respectively, of the tank 102.

The water heater 100 further includes one or more heat trap apparatuses 122 mounted on the wall 104 at the top end 108 of the tank 102. Particularly, the one or more heat trap apparatuses 122 are coupled through the wall 104 and configured to allow flow of water therethrough while preventing convective fluid flow therethrough. In an embodiment, the water heater 100 includes a first heat trap apparatus 122A associated with a cold-water supply line and a second heat trap apparatus 122B associated with a hot water discharge line. The first heat trap apparatus 122A and the second heat trap apparatus 122B are hereinafter collectively referred to as 'the heat trap apparatuses 122' or individually referred to as 'the heat trap apparatus 122' unless otherwise specifically mentioned. The water heater 100 further includes one or more conduits 124 fluidly coupled to the heat trap apparatuses 122. In an embodiment, an inlet conduit 124A is coupled to the first heat trap apparatus 122A and configured to allow ingress of water into the tank 102 through the first heat trap apparatus 122A. An outlet conduit 124B is coupled to the second heat trap apparatus 122B and configured to allow egress of water from the tank 102 through the second heat trap apparatus 122B. When the water heater 100 is not in operating mode, the heat trap apparatuses 122 prevent convective fluid flow therethrough, hence the temperature of the hot water inside the tank 102 is maintained for longer period and thereby the water heater 100 becomes more energy efficient.

In an embodiment, the heat trap apparatus 122 may be a cylindrical body having a length greater than a thickness of the wall 104 of the tank 102. In an assembled condition of the heat trap apparatus 122 with the tank 102, the heat trap apparatus 122 may be inserted through a hole (not shown) provided in the wall 104 of the tank 102 and both ends of the cylindrical body is projected beyond the thickness of the wall 104. As such, a dip tube 126 associated with the cold-water supply line is coupled to a bottom end of the heat trap apparatus 122 to discharge colder water towards the base 112 of the tank 102. Heated water is drawn from the tank 102 through the outlet conduit 124B with aid of, for example, a pump, and may be delivered to one or more end devices, such as laundry washer, dishwasher, faucets, and shower heads. In an embodiment, the wall 104 of the tank 102 may be insulated to retain temperature of the water for longer duration.

Figure 2:
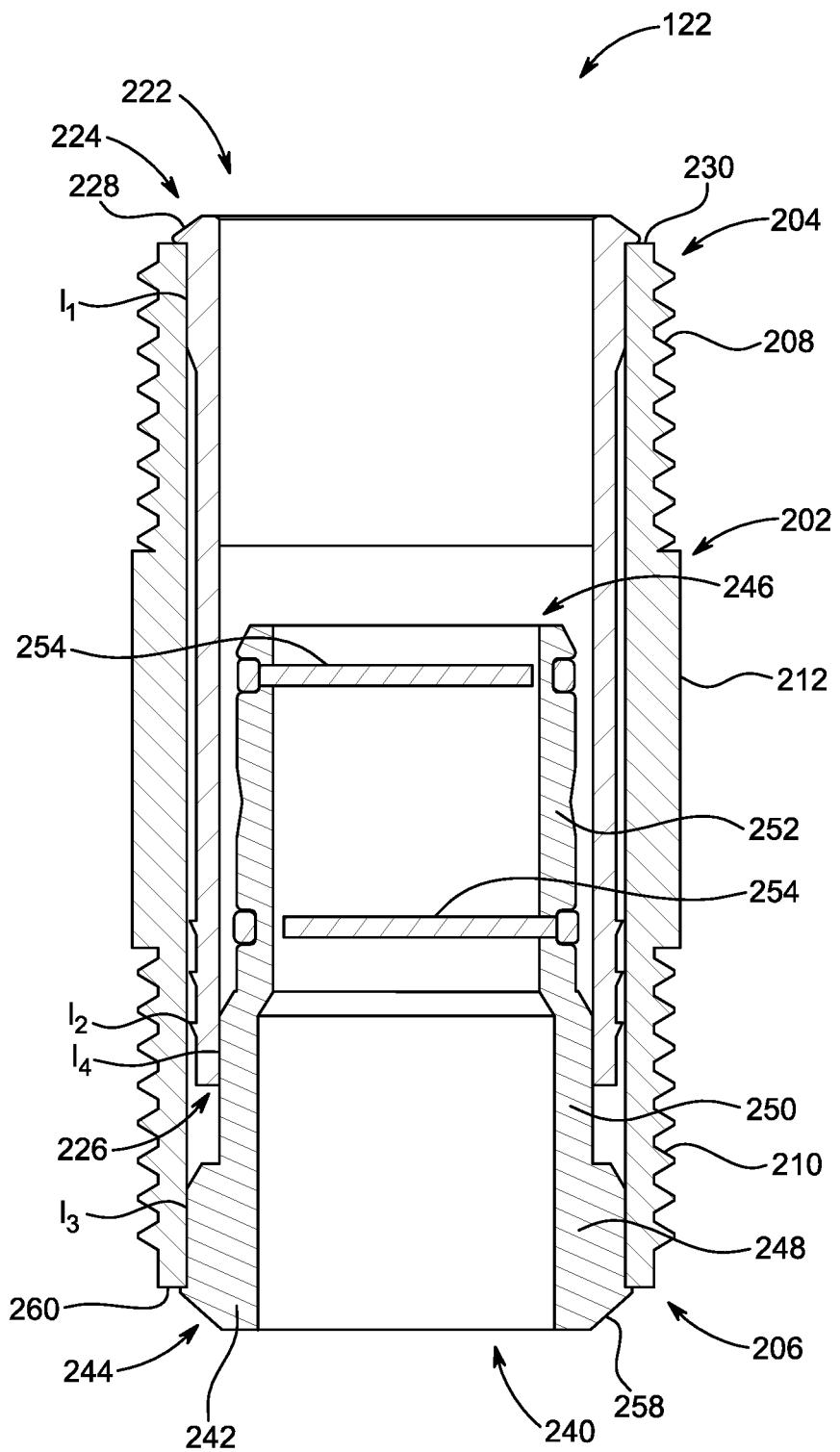
FIG. 2 is a cross-sectional view of the heat trap apparatus, according to an embodiment of the present disclosure.

Referring to FIG. 2, a cross-sectional view of the heat trap apparatus 122 is illustrated, according to an embodiment of the present disclosure. The first heat trap apparatus 122A associated with the cold-water supply line is described in detail hereinbelow for the mere purpose of explanation. The heat trap apparatus 122 includes a tubular body 202 having a first end 204 and a second end 206. The first end 204 includes a first thread 208 configured to couple with the inlet conduit 124A and the second end 206 includes a second thread 210 configured to couple with the dip tube 126. The tubular body 202 further includes a middle portion 212 defined between the first thread 208 and the second thread 210 and configured to engage with a peripheral surface of the hole defined in the wall 104 of the tank 102. The tubular body 202 has a length 'L1' (shown in FIG. 3A) defined between the first end 204 and the second end 206.

The heat trap apparatus 122 further includes a liner 222 disposed within the tubular body 202. The liner 222 includes a first end 224 and a second end 226, and has a length 'L2' (shown in FIG. 3B) defined between the first end 224 and the second end 226. The length 'L2' of the liner 222 is smaller than the length 'L1' of the tubular body 202. The liner 222 further includes a flange 228 at the first end 224 and configured to engage with a peripheral edge 230 at the first end 204 of the tubular body 202. The flange 228 may further act as a seal between tubular body 202 and the liner to prevent flow of water. During assembly of the heat trap apparatus 122, the second end 226 of the liner 222 is inserted from the first end 204 of the tubular body 202 and the liner 222 is pushed inside the tubular body 202 until the flange 228 contacts with the peripheral edge 230 at the first end 204 of the tubular body 202.

The heat trap apparatus 122 further includes a heat trap baffle assembly 240 having a tubular housing 242 coaxially disposed within the liner 222. The tubular housing 242 has a first end 244 and a second end 246. The tubular housing 242 further includes a first diametric portion 248 at the first end 244, a second diametric portion 250 extending from the first diametric portion 248, and a third diametric portion 252 extending from the second diametric portion 250. The third diametric portion 252 is configured to movably support one or more heat trap inserts 254 to inhibit convective fluid flow therethrough. The one or more heat trap inserts 254 are configured to allow flow of water therethrough while preventing convective fluid flow therethrough, thereby maintain temperature of the water within the tank 102 for a longer period when the water heater 100 is not in operating mode. The tubular housing 242 further includes a flange 258 at the first end 244 and configured to engage with a peripheral edge 260 at the second end 206 of the tubular body 202. During assembly of the heat trap apparatus 122, the second end 246 of the tubular housing 242 is inserted from the second end 206 of the tubular body 202 and the tubular housing 242 is pushed inside the tubular body 202 and the liner 222 until the flange 258 contacts with the peripheral edge 260 at the second end 206 of the tubular body 202.

Figure 3A:
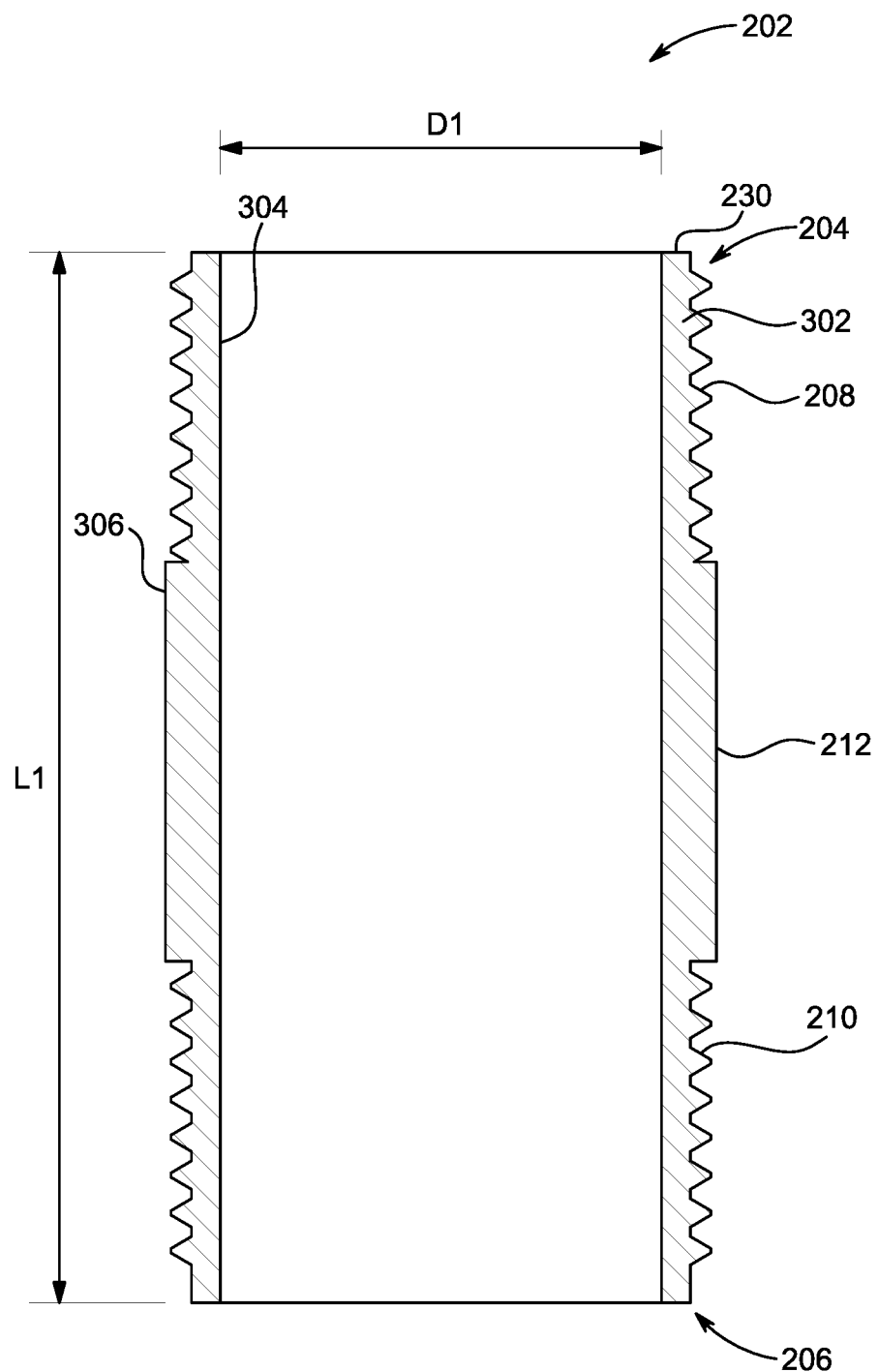
FIG. 3A is a cross-sectional view of a tubular body of the heat trap apparatus, according to an embodiment of the present disclosure.

Referring to FIG. 3A, a cross-sectional view of the tubular body 202 of the heat trap apparatus 122 is illustrated, according to an embodiment of the present disclosure. Referring to FIG. 2 and FIG. 3A, the tubular body 202 includes a wall 302 defining an inner surface 304 and an outer surface 306. The first thread 208 is provided at the outer surface 306 at the first end 204 of the tubular body 202 and the second thread 210 is provided at the outer surface 306 at the second end 206 of the tubular body 202. In some embodiments, the first end 204 and the second end 206 of the tubular body 202 may include any fluid tight connection mechanism known to person ordinary skill in the art to fluid tightly engages with the inlet conduit 124A and the dip tube 126, respectively. The outer surface 306 at the middle portion 212 may contact the peripheral surface of the hole defined in the wall 104 of the tank 102. The middle portion 212 of the tubular body 202 has a length greater than or equal to the thickness of the wall 104 of the tank 102 as such the first thread 208 is projected above an outer surface of the wall 104 and the second thread 210 is projected below an inner surface of the wall 104 of the tank 102 to engage with the inlet conduit 124A and the dip tube 126, respectively. The tubular body 202 has an inner diameter 'D1' consistent throughout the length 'L1' thereof. In an embodiment, the tubular body 202 is made of a material comprising a metal. In an alternate embodiment, the tubular body 202 may be made of metal alloys such as steel. In various embodiments, the tubular body 202 may be made of any hard material known to a person ordinary skill in the art.

Figure 3B:
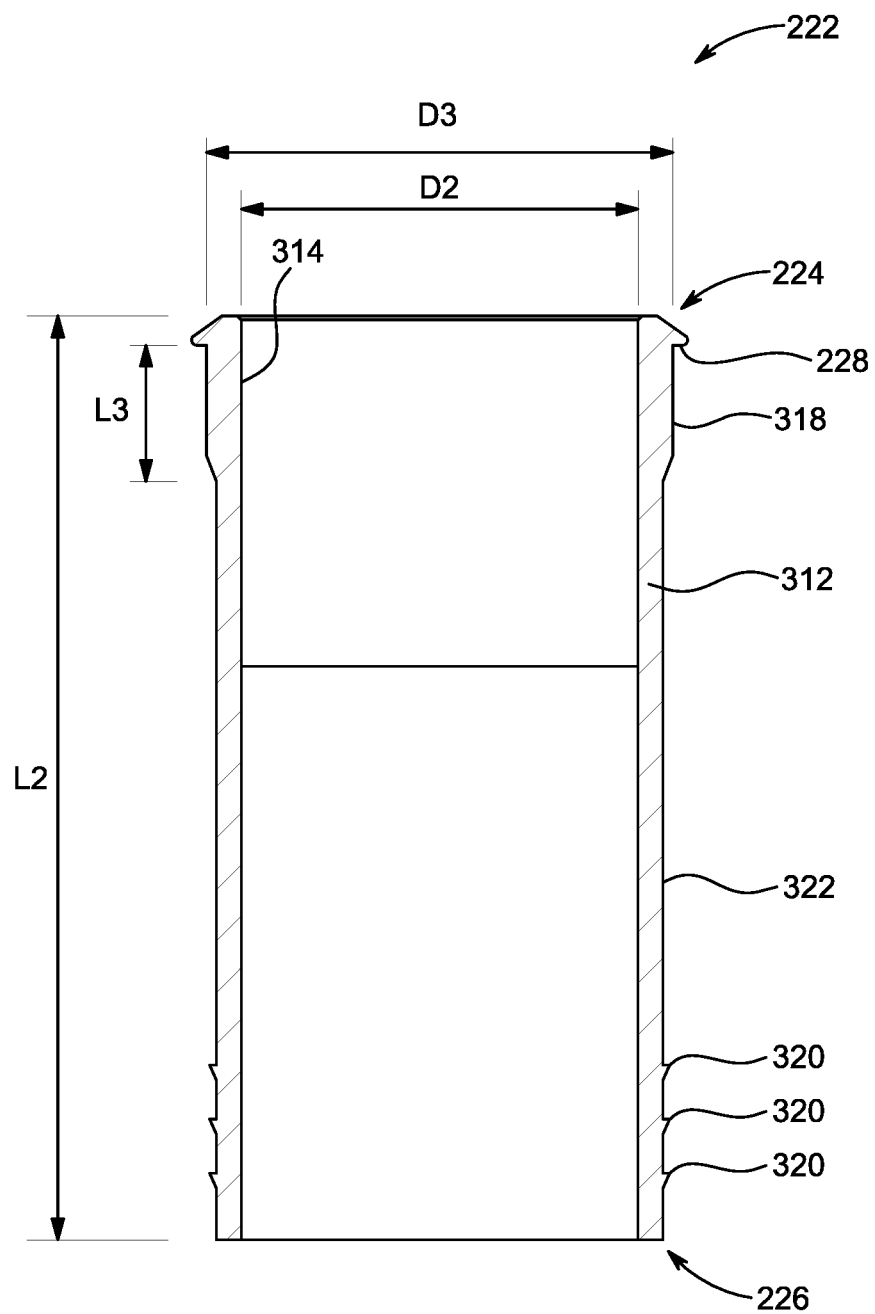
FIG. 3B is a cross-sectional view of a liner of the heat trap apparatus, according to an embodiment of the present disclosure.

Referring to FIG. 3B, a cross-sectional view of the liner 222 of the heat trap apparatus 122 is illustrated, according to an embodiment of the present disclosure. Referring to FIG. 2 and FIG. 3B, the liner 222 is disposed within the tubular body 202. The liner 222 includes a wall 312 defining an inner surface 314 and has an inner diameter 'D2' consistent throughout the length 'L2' thereof. The liner 222 further includes a projection 318 at the first end 224 and configured to engage with the inner surface 304 at the first end 204 of the tubular body 202 using an interference fit 'I$_1$'. The interference fit 'I$_1$' is otherwise known as 'friction fit' or 'press fit'. During assembly of the heat trap apparatus 122, the liner 222 may be pressed into the tubular body 202 and due to a difference between external dimension of the projection 318 of the liner 222 and internal dimension of the tubular body 202, a friction may be created between the projection 318 and the inner surface 304 of the tubular body 202 which in turn causes the interference fit 'I$_1$' between the liner 222 and the tubular body 202. Particularly, the projection 318 of the liner 222 has an outer diameter 'D3' greater than the inner diameter 'D1' of the tubular body 202, such a difference value between the outer diameter 'D3' of the projection 318 and the inner diameter 'D1' of the tubular body 202 causes the interference fit 'I$_1$' between the liner 222 and the tubular body 202. In an embodiment, the difference value between the outer diameter 'D3' of the projection 318 and the inner diameter 'D1' of the tubular body 202 is about 0.015 to 0.025 inches, to achieve the interference fit 'I$_1$' therebetween. In one embodiment, the liner 222 is made of a material comprising a plastic. In various embodiments, the liner 222 may be made of any nonflexible plastic material known to a person ordinary skill in the art to prevent transfer of heat. As such, the liner 222 may act as an insulator to prevent transfer of heat from hot water to the tubular body 202.

In an embodiment, a length 'L3' of the projection 318 may be around 10 percent of the length 'L2' of the liner 222 and remaining portion, particularly the portion towards the second end 226 of the liner 222, has an external diameter smaller than the inner diameter 'D1' of the tubular body 202. In some embodiments, the length 'L3' of the projection 318 may be in a range of about 8 to 20 percent of the length 'L2' of the liner 222. As such, the second end 226 of the liner 222 is freely inserted from the first end 204 of the tubular body 202 and additional force may be applied to push the projection 318 of the liner 222 inside the tubular body 202 to achieve the interference fit 'I$_1$' therebetween. The interference fit 'I$_1$' may be defined based on various factors including, but not limited to, material of the liner 222, material of the tubular body 202 and capacity of the water heater 100.

The liner 222 further includes one or more ribs 320 defined at an outer surface 322 at the second end 226. The one or more ribs 320 are configured to engage with the inner surface 304 of the tubular body 202 to achieve an interference fit 'I$_2$' therebetween. As shown in FIG. 3B, the liner 222 includes three ribs 320 at equidistance along the length 'L2' thereof at the second end 226. In some embodiments, the liner 222 may include more than three ribs 320. The ribs 320 may further reinforce the connection between the tubular body 202 and the liner 222 by providing the interference fit 'I$_2$' in addition to the interference fit 'I$_1$' between the projection 318 and the inner surface 304 of the tubular body 202. Further, the one or more ribs 320 may act as a seal between the liner 222 and the tubular body 202 to prevent flow of water between the liner 222 and the tubular body 202.

Figure 3C:
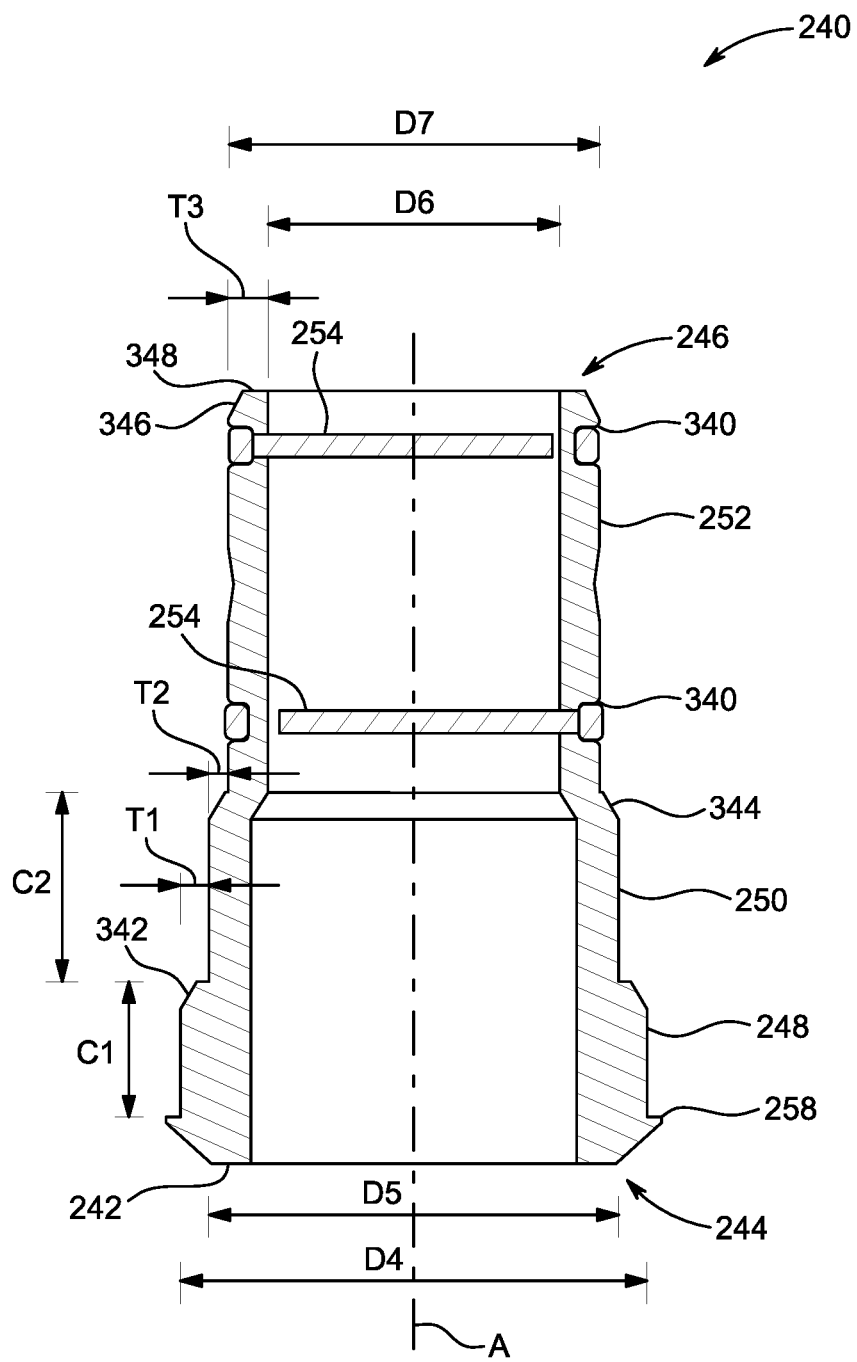
FIG. 3C is a cross-sectional view of a heat trap baffle assembly of the heat trap apparatus, according to an embodiment of the present disclosure.

Referring to FIG. 3C, a cross-sectional view of the heat trap baffle assembly 240 of the heat trap apparatus 122 is illustrated, according to an embodiment of the present disclosure. Referring to FIG. 2 and FIG. 3C, the heat trap baffle assembly 240 includes the tubular housing 242 coaxially disposed within the liner 222. The tubular housing 242 includes the first diametric portion 248 at the first end 244 and configured to engage with the inner surface 304 at the second end 206 of the tubular body 202 using an interference fit 'I$_3$'. During assembly of the heat trap apparatus 122, the tubular housing 242 is pressed into the tubular body 202 and the liner 222, and due to difference between external dimension of the first diametric portion 248 and the internal dimension of the tubular body 202, a friction is created between the first diametric portion 248 and the inner surface 304 of the tubular body 202 to achieve the interference fit 'I$_3$' between the tubular housing 242 and the tubular body 202. Particularly, the first diametric portion 248 has an outer diameter 'D4' greater than the inner diameter 'D1' of the tubular body 202, such a difference value between the outer diameter 'D4' of the first diametric portion 248 and the inner diameter 'D1' of the tubular body 202 causes the interference fit '$I_3$' between the tubular housing 242 and the tubular body 202. The interference fit '$I_3$' may be defined based on various factors including, but not limited to, material of the tubular housing 242, material of the tubular body 202, a length 'C1' of the first diametric portion 248, and capacity of the water heater 100. In an embodiment, the difference value between the outer diameter 'D4' of the first diametric portion 248 and the inner diameter 'D1' of the tubular body 202 is about 0.015 to 0.025 inches, to achieve the interference fit '$I_3$' therebetween.

The tubular housing 242 further includes the second diametric portion 250 extending from the first diametric portion 248 and configured to engage with the inner surface 314 at the second end 226 of the liner 222 using an interference fit '$I_4$'. As the tubular housing 242 is pressed into the tubular body 202 and the liner 222, the first diametric portion 248 causes the interference fit '$I_3$' with the tubular body 202, subsequently, due to difference between external dimension of the second diametric portion 250 and internal dimension of the liner 222, a friction is created between the second diametric portion 250 and the inner surface 314 of the liner 222 to achieve the interference fit '$I_4$' between the tubular housing 242 and the liner 222. Particularly, the second diametric portion 250 has an outer diameter 'D5' greater than the inner diameter 'D2' of the liner 222, such a difference value between the outer diameter 'D5' of the second diametric portion 250 and the inner diameter 'D2' of the liner 222 causes the interference fit '$I_4$' between the tubular housing 242 and the liner 222. The interference fit '$I_4$' may be defined based on various factors including, but not limited to, the material of the tubular housing 242, the material of the liner 222, a length 'C2' of the second diametric portion 250, and capacity of the water heater 100. In an embodiment, the difference value between the outer diameter 'D5' of the second diametric portion 250 and the inner diameter 'D2' of the liner 222 is about 0.015 to 0.025 inches, to achieve the interference fit '$I_4$' therebetween.

The tubular housing 242 further includes the third diametric portion 252 extending from the second diametric portion 250. The third diametric portion 252 is configured to movably support the one or more heat trap inserts 254 to inhibit convective fluid flow therethrough. In an embodiment, the third diametric portion 252 may include one or more slots 340 to movably support the one or more heat trap inserts 254. In one embodiment, the one or more heat trap inserts 254 may be flapper structures as shown in FIG. 3C. The tubular housing 242 may include the one or more slots 340 at the third diametric portion 252 to accommodate the one or more flapper structures. The flapper structures may be movably received in the slots 340 and configured to rotate or deflect to allow flow of water while preventing convective fluid flow therethrough. In an alternate embodiment, the one or more heat trap inserts 254 may include ball type valve arrangement. In some embodiments, an inner diameter 'D6' of the third diametric portion 252 may be defined to accommodate any heat trap unit known to a person ordinary skill in the art. In one embodiment, the tubular housing 242 is made of a material comprising a plastic. In various embodiments, the tubular housing 242 may be made of any non-flexible plastic material known to a person ordinary skill in the art.

In an alternate embodiment, the third diametric portion 252 along with the one or more heat trap inserts 254 may extend from the first diametric portion 248 at the first end 244 of the tubular housing 242 to fluidly communicate with the dip tube 126.

The tubular housing 242 includes a first chamfer portion 342 at a juncture of the first diametric portion 248 and the second diametric portion 250. The first chamfer portion 342 is defined in such a way to allow smooth entry of the tubular housing 242 within the tubular body 202. Particularly, the first chamfer portion 342 is defined at the first diametric portion 248 and tapered towards the second diametric portion 250. The first chamfer portion 342 may be defined based on various factors including, but not limited to, a thickness 'T1' of the first diametric portion 248 defined between the outer diameter 'D4' of the first diametric portion 248 and the outer diameter 'D5' of the second diametric portion 250. In an embodiment, an angle of inclination of the first chamfer portion 342 with respect to a longitudinal axis 'A' of the tubular housing 242 may be in a range of about 30 degrees to 45 degrees.

The tubular housing 242 further includes a second chamfer portion 344 at a juncture of the second diametric portion 250 and the third diametric portion 252. The second chamfer portion 344 is defined in such a way to allow smooth entry of the tubular housing 242 within the liner 122. Particularly, the second chamfer portion 344 is defined at the second diametric portion 250 and tapered towards the third diametric portion 252. The second chamfer portion 344 may be defined based on various factors including, but not limited to, a thickness 'T2' of the second diametric portion 250 defined between the outer diameter 'D5' of the second diametric portion 250 and an outer diameter 'D7' of the third diametric portion 252. In an embodiment, an angle of inclination of the second chamfer portion 344 with respect to the longitudinal axis 'A' of the tubular housing 242 may be in a range of about 30 degrees to 45 degrees.

The tubular housing 242 further includes a third chamfer portion 346 defined at a peripheral edge 348 of the second end 246. The third chamfer portion 346 is defined in such a way to allow smooth entry of the tubular housing 242 within the tubular body 202 and the liner 222. The third chamfer portion 346 may be defined based on various factors including, but not limited to, a thickness 'T3' of the third diametric portion defined between the outer diameter 'D7' and the inner diameter 'D6' thereof. In an embodiment, an angle of inclination of the third chamfer portion 346 with respect to the longitudinal axis 'A' of the tubular housing 242 may be in a range of about 30 degrees to 45 degrees.

INDUSTRIAL APPLICABILITY

The present disclosure relates to the heat trap apparatus 122 having the tubular body 202, the liner 222 disposed within the tubular body 202, and the heat trap baffle assembly 240 having the tubular housing 242 coaxially disposed within the liner 222. The tubular body 202 is made of metal and includes the first thread 208 and the second thread 210 to couple with the conduits 124. The liner 222 is made of plastic and fitted with the tubular body 202 using the interference fit '$I_1$'. The one or more ribs 320 defined at the outer surface 322 of the liner 222 may further reinforce the connection between the tubular body 202 and the liner 222 by providing the interference fit '$I_2$' in addition to the interference fit '$I_1$' between the projection 318 and the inner surface 304 of the tubular body 202. The flange 228 of the liner 222 may further seal the connection between the tubular body 202 and the liner 222.

The tubular housing 242 is fitted with the tubular body 202 and the liner 222 with the help of the interference fit 'I$_3$' created between the first diametric portion 248 and the inner surface 304 of the tubular body 202 and the interference fit 'I$_4$' created between the second diametric portion 250 and the inner surface 314 of the liner 222. The first chamfer portion 342, the second chamfer portion 344, and the third chamfer portion 346 allow smooth entry of the tubular housing 242 within the tubular body 202 and the liner 222.

The heat trap apparatus 122 of the present disclosure has a better fitment between the liner 222 and the tubular body 202 such that potential water flow between the liner 222 and the tubular body 202 is reduced. The liner 222 of the present disclosure make the heat trap apparatus 122 more reliable by way of eliminating the implementation of any additional sealing components such as O-rings. The heat trap apparatus 122 is designed in such a way to avoid premature failure of components such as the liner 222 and the heat trap baffle assembly 240.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A heat trap apparatus for a water heater, comprising:
   a tubular body comprising:
      a first end;
      a second end disposed opposite the first end;
      an inner surface extending from the first end to the second end; and
      an outer surface extending from the first end to the second end;
   a liner disposed within the tubular body, the liner comprising:
      a tubular wall; and
      a projection extending radially outward from the tubular wall and configured to engage with the inner surface of the tubular body at the first end of the tubular body using a first interference fit; and
   a heat trap baffle assembly comprising a tubular housing coaxially disposed within the liner, the tubular housing comprising:
      a first diametric portion configured to engage with the inner surface of the tubular body at the second end of the tubular body using a second interference fit;
      a second diametric portion extending from the first diametric portion and configured to engage with an inner surface of the liner using a third interference fit; and
      a third diametric portion extending from the second diametric portion and configured to movably support one or more heat trap inserts to inhibit convective fluid flow therethrough.

2. The heat trap apparatus of claim 1, wherein the projection of the liner is located near a first end of the liner, and wherein a length of the liner defined between the first end and a second end of the liner is smaller than a length of the tubular body defined between the first end and the second end of the tubular body.

3. The heat trap apparatus of claim 2, wherein the liner further comprises a flange located at the first end of the liner and configured to engage with a peripheral edge of the first end of the tubular body.

4. The heat trap apparatus of claim 2, wherein the liner further comprises one or more ribs extending radially outward from the tubular wall and located near the second end of the liner, and wherein the one or more ribs are configured to engage with the inner surface of the tubular body to achieve a fourth interference fit therebetween.

5. The heat trap apparatus of claim 1, wherein a difference value between an outer diameter of the projection of the liner and an inner diameter of the tubular body is about 0.015 to 0.025 inches, to achieve the first interference fit therebetween.

6. The heat trap apparatus of claim 1, wherein the liner is made of a material comprising a plastic.

7. The heat trap apparatus of claim 1, wherein the tubular body is made of a material comprising a metal.

8. The heat trap apparatus of claim 1, wherein the tubular housing further comprises a flange located at a first end of the tubular housing and configured to engage with a peripheral edge of the second end of the tubular body.

9. The heat trap apparatus of claim 1, wherein the tubular housing further comprises a first chamfer portion at a juncture of the first diametric portion and the second diametric portion.

10. The heat trap apparatus of claim 1, wherein the tubular housing further comprises a second chamfer portion at a juncture of the second diametric portion and the third diametric portion.

11. The heat trap apparatus of claim 1, wherein the tubular housing further comprises a third chamfer portion defined at a peripheral edge of a second end of the tubular housing.

12. The heat trap apparatus of claim 1, wherein a difference value between an outer diameter of the first diametric portion of the tubular housing and an inner diameter of the tubular body is about 0.015 to 0.025 inches, to achieve the second interference fit therebetween.

13. The heat trap apparatus of claim 1, wherein a difference value between an outer diameter of the second diametric portion of the tubular housing and an inner diameter of the liner is about 0.015 to 0.025 inches, to achieve the third interference fit therebetween.

14. The heat trap apparatus of claim 1, wherein the third diametric portion of the tubular housing comprises one or more slots to movably support the one or more heat trap inserts.

15. The heat trap apparatus of claim 1, wherein the tubular housing is made of a material comprising a plastic.

16. A water heater comprising:
   a tank;
   one or more heat trap apparatuses mounted on the tank; and
   one or more conduits fluidly coupled to the one or more heat trap apparatuses, wherein each of the one or more heat trap apparatuses comprises:
      a tubular body configured to fluidly couple with one of the one or more conduits, the tubular body comprising:
         a first end;
         a second end disposed opposite the first end;
         an inner surface extending from the first end to the second end; and
         an outer surface extending from the first end to the second end;

a liner disposed within the tubular body, the liner comprising:
  a tubular wall; and
  a projection extending radially outward from the tubular wall and configured to engage with the inner surface of the tubular body at the first end of the tubular body using a first interference fit; and
a heat trap baffle assembly comprising a tubular housing coaxially disposed within the liner, the tubular housing comprising:
  a first diametric portion configured to engage with the inner surface of the tubular body at the second end of the tubular body using a second interference fit;
  a second diametric portion extending from the first diametric portion and configured to engage with an inner surface of the liner using a third interference fit; and
  a third diametric portion extending from the second diametric portion and configured to movably support one or more heat trap inserts to inhibit convective fluid flow therethrough.

17. The water heater of claim 16, wherein each of the first end and the second end of the tubular body comprises threads configured to fluid tightly couple with the one or more conduits.

* * * * *